(12) United States Patent
Lee

(10) Patent No.: US 8,971,078 B2
(45) Date of Patent: Mar. 3, 2015

(54) DC/AC INVERTER SWITCH CONTROLLER

(71) Applicant: LSIS Co., Ltd., Anyang-si, Gyeonggi-do (KR)

(72) Inventor: Ki Su Lee, Anyang-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 14/017,873

(22) Filed: Sep. 4, 2013

(65) Prior Publication Data

US 2014/0063881 A1 Mar. 6, 2014

(30) Foreign Application Priority Data

Sep. 5, 2012 (KR) .................. 10-2012-0098501

(51) Int. Cl.
*H02M 7/44* (2006.01)
*H02M 3/00* (2006.01)
*H02M 7/48* (2006.01)
*H02M 1/00* (2006.01)

(52) U.S. Cl.
CPC ............... *H02M 7/44* (2013.01); *H02M 3/005* (2013.01); *H02M 7/4807* (2013.01); *H02M 2001/007* (2013.01)
USPC ............................................. 363/95; 363/98

(58) Field of Classification Search
USPC .................................................... 363/95, 98
See application file for complete search history.

(56) References Cited

U.S. PATENT DOCUMENTS 5,969,484 A * 10/1999 Santi et al. ..................... 315/247
7,619,323 B2 * 11/2009 Tan et al. ......................... 307/82
8,724,356 B2 * 5/2014 Pan et al. ....................... 363/131
2012/0228938 A1 * 9/2012 Thieringer et al. ............. 307/43

FOREIGN PATENT DOCUMENTS

| DE | 10-2011-017601 | 10/2012 |
| JP | 09-117151 | 5/1997 |
| JP | 2004-536544 | 12/2004 |
| WO | 2011/029650 | 3/2011 |

OTHER PUBLICATIONS

Sanchis, et al., "Operation and Control of a High Performance Inverter Consisting of a Buck-Boost and a Zero Switching Losses H-Bridge for Photovoltaic Systems," 2004 35th Annual IEEE Power Electronics Specialists Conference, XP010739593, Jun. 2004, pp. 2089-2094.
European Patent Office Application Serial No. 13182973.1, Search Report dated Nov. 25, 2013, 6 pages.
Japan Patent Office Application Serial No. 2013-183364, Office Action dated Jul. 8, 2014, 4 pages.

* cited by examiner

*Primary Examiner* — Emily P Pham
(74) *Attorney, Agent, or Firm* — Lee, Hong, Degerman, Kang & Waimey

(57) ABSTRACT

An inverter according to an embodiment of the present disclosure may include a converter having a switch, configured to convert a DC voltage into a half-wave rectified sine waveform voltage; a switching device unit having a switch, configured to convert the half-wave rectified sine waveform voltage into a sine waveform voltage; and a controller configured to control the on/off of the switch of the converter and the switch of the switching device unit.

10 Claims, 7 Drawing Sheets

DC/AC INVERTER SWITCH CONTROLLER

CROSS-REFERENCE TO RELATED APPLICATIONS

Pursuant to 35 U.S.C. §119(a), this application claims the benefit of earlier date and right of priority to Korean Patent Application No. 10-2012-0098501, filed on Sep. 5, 2012, the contents of which is incorporated by reference herein in its entirety.

BACKGROUND OF THE INVENTION

1. Field of the Invention

The present disclosure relates to an inverter, and more particularly, to an inverter with high efficiency.

2. Description of the Related Art

For an inverter in the related art, when an input voltage through the input unit is boosted or bucked through a DC/DC converter (boost converter or buck converter), the boosted or bucked voltage is switched at high speed using four switches through PWM control in the switching device unit to generate an AC voltage, which is subject to a filtering process with a filter and then subject to a process of converting the AC voltage into a DC voltage.

However, according to the related art, all switched thereinside may be switched at high speed, thereby causing a problem in which a lot of switching loss is generated.

SUMMARY OF THE INVENTION

A technical task of the present invention contrived to solve the foregoing problem is to reduce the number of switching cycles in a switch within the inverter, thereby reducing the switching loss of the inverter.

In order to accomplish the foregoing objective, an inverter according to an embodiment of the present disclosure may include a converter having a switch, configured to convert a DC voltage into a half-wave rectified sine waveform voltage; a switching device unit having a switch, configured to convert the half-wave rectified sine waveform voltage into a sine waveform voltage; and a controller configured to control the on/off of the switch of the converter and the switch of the switching device unit.

In order to accomplish the foregoing objective, an inverter according to an embodiment of the present disclosure may include a first inductor; a first switch having an end thereof connected to an end of the first inductor; a first capacitor having an end thereof connected to an end of the first switch; a diode having an anode connected to the other end of the first capacitor and a cathode connected to the other end of the first switch; four second switches connected in a bridge form having two input ends and two output ends; and a controller, wherein the two input ends are connected to both ends of the diode, respectively.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
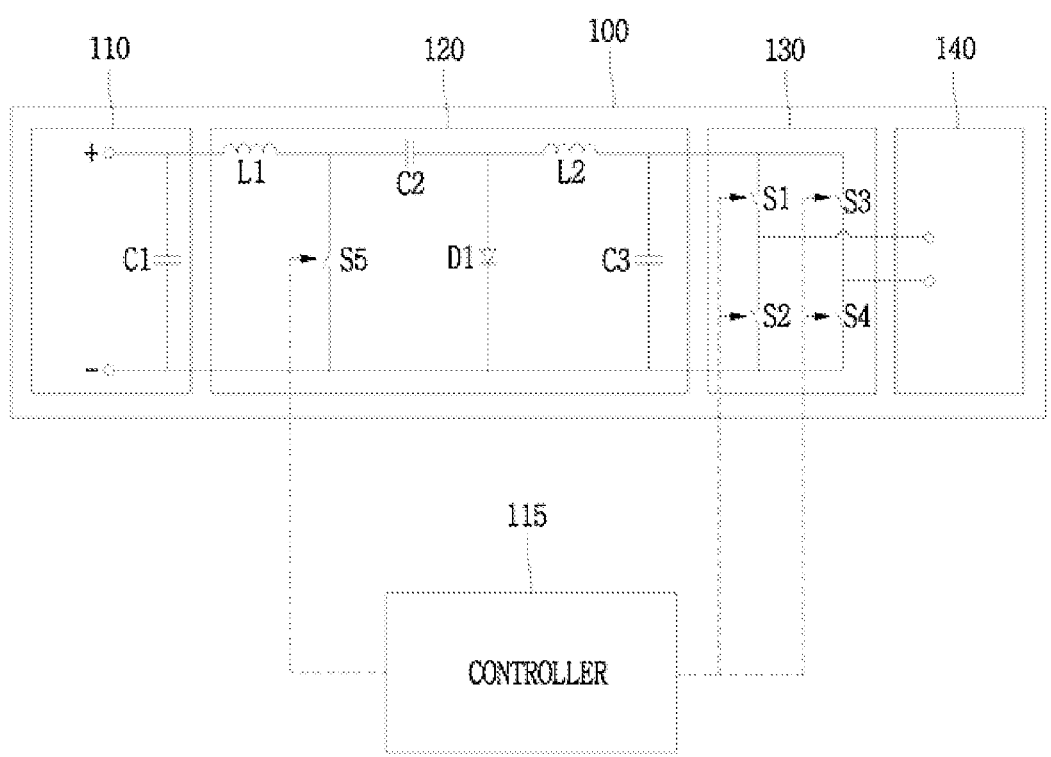
FIG. 1 is a circuit diagram illustrating an inverter according to an embodiment of the present disclosure.

Hereinafter, preferred embodiments of the present invention will be described in detail with reference to the accompanying drawings to such an extent that the present invention can be easily embodied by a person having ordinary skill in the art to which the present invention pertains. However, the present invention may be implemented in various different forms, and therefore, the present invention is not limited to the illustrated embodiments. In order to clearly describe the present invention, parts not related to the description are omitted, and like reference numerals designate like constituent elements throughout the specification.

Throughout the specification, when a portion may "include" a certain constituent element, unless specified otherwise, it may not be construed to exclude another constituent element but may be construed to further include other constituent elements.

Throughout the specification, in case where a portion is "connected" to the other portion, it may include a case of being electrically connected to the other portion by interposing another device therebetween as well as a case of being directly connected the other portion. An inverter according to the present disclosure may be operated as a single-phase inverter with a single device, a three-phase inverter when three devices are linked together, or the like.

Furthermore, the inverter can be used in various applications, such as a grid connected type, a stand alone type, a motor drive type, for an apparatus in which the inverter is used.

Hereinafter, an inverter according to an embodiment of the present disclosure will be described with reference to FIGS. 1 through 6.

FIG. 1 is a circuit diagram illustrating an inverter according to an embodiment of the present disclosure.

As illustrated in FIG. 1, the inverter 100 according to an embodiment of the present disclosure may include an input unit 110, a controller 115, a Cuk converter 120, a switching device unit 130, and an output unit 140.

The input unit 110 output an input voltage (Vi) to the Cuk converter 120. The input unit 110 according to an embodiment of the present disclosure may include a capacitor (C1).

An end of the capacitor (C1) within the input unit 110 according to an embodiment of the present disclosure is connected to a plus terminal, and the other end of the capacitor (C1) is connected to a minus terminal.

The controller 115 controls the on/off of switches through a switching signal.

The controller 115 according to an embodiment of the present disclosure adjusts the switching signal, thereby changing a switching duty of the switch.

The Cuk converter 120 receives the input voltage (Vi) and outputs an output voltage (Vinv1) to the switching device unit 130.

The Cuk converter 120 according to an embodiment of the present disclosure may include a first inductor (L1), a second inductor (L2), a first capacitor (C2), a second capacitor (C3), a diode (D1) and a switch (S5) within the converter.

An end of the first inductor (L1) is connected to an end of the capacitor (C1), and the other end of the first inductor (L1) is connected to an end of the first capacitor (C2).

An end of the switch (S5) within the converter is connected to a matching point between the first inductor (L1) and the first capacitor (C2), and the other end of the switch (S5) within the converter is connected to the minus terminal.

The other end of the first capacitor (C2) is connected to an end of the second inductor (L2).

The other end of the second inductor (L2) is connected to an end of the second capacitor (C3).

The other end of the second capacitor (C3) is connected to the minus terminal.

An anode of the diode (D1) is connected to a matching point between the first capacitor (C2) and the second inductor (L2), and a cathode of the diode (D1) is connected to the minus terminal.

A ratio of the output voltage (Vinv1) of the Cuk converter 120 to the input voltage (Vi) may be defined as Equation 1.

$$Vinv1/Vi = D/(1-D)$$ [Equation 1]

(Vinv1: output voltage of the Cuk converter 120, Vi: input voltage, D: switching duty of the switch (S5) within the Cuk converter)

According to Equation 1, if the switching duty is changed, then the output voltage (Vinv1) of the Cuk converter 120 varies in correspondence to this.

According to an embodiment of the present disclosure, in case where a constant DC voltage is applied to the input voltage (Vi), if the controller 115 changes the switching duty (D) of the switch (S5) within the Cuk converter 120, then the output voltage (Vinv1) of the Cuk converter 120 varies in correspondence to the value of D. Accordingly, the output voltage (Vinv1) of the Cuk converter 120 with a user's desired form may be obtained by adjusting the value of D. According to an embodiment of the present disclosure, when the controller 115 adjusts the switching duty (D) of S5, the Cuk converter 120 according to an embodiment of the present disclosure changes the input voltage (Vi) to a half-wave rectified sine waveform for the output.

Figure 2:
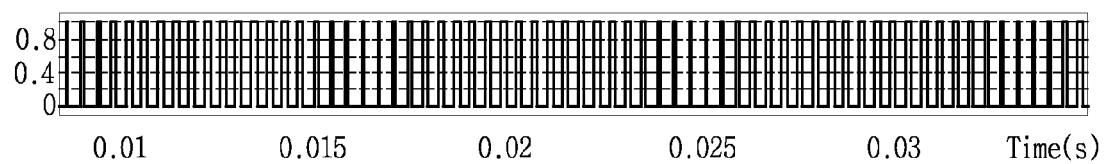
FIG. 2 is a view illustrating the switching duty of a switch within a converter according to an embodiment of the present disclosure.
Figure 3:
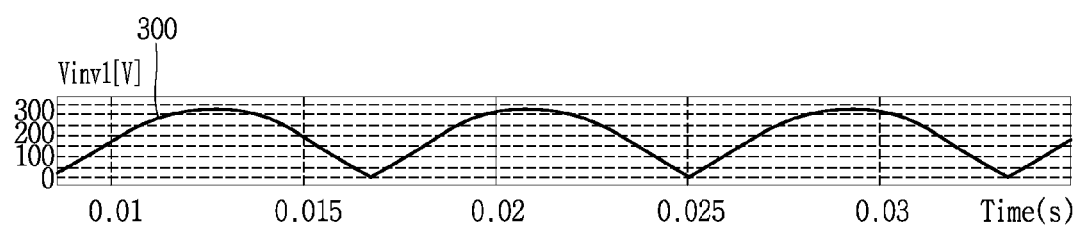
FIG. 3 is a view illustrating the output voltage waveform of a Cuk converter according to an embodiment of the present disclosure.

FIG. 2 is a view illustrating the switching duty of a switch (S5) within the Cuk converter 120 according to an embodiment of the present disclosure, and FIG. 3 is a view illustrating the output voltage waveform of a Cuk converter according to an embodiment of the present disclosure.

According to an embodiment of the present disclosure, when the controller 115 adjusts the switching duty of the switch (S5) within the converter 120 in an arbitrary manner as illustrated in FIG. 2, the Cuk converter 120 may output the output voltage of the Cuk converter 120 in the form of a half-wave rectified sine waveform voltage as illustrated in FIG. 3.

The switching device unit 130 receives the output voltage (Vinv1) of the Cuk converter 120 as an input and outputs the output voltage (Vout1).

The switching device unit 130 according to an embodiment of the present disclosure may include four switches (S1, S2, S3, S4).

For the switches according to an embodiment of the present disclosure, the first and the second switch (S1, S2) and the third and the fourth switch (S3, S4) connected in series to each other are connected in parallel to the second capacitor (C3), respectively.

The switches (S1-S4) according to an embodiment of the present disclosure operate by receiving a switching signal of the controller 115. According to an embodiment of the present disclosure, the controller 115 may adjust the switching signal, thereby allowing a set of the first and the fourth switch (first switch set) and another set of the second and the third switch (second switch set) to be alternately switched for each set.

The alternate timing of the switch is a time point at which the output voltage of the switching device unit 130 becomes zero.

Figure 4:
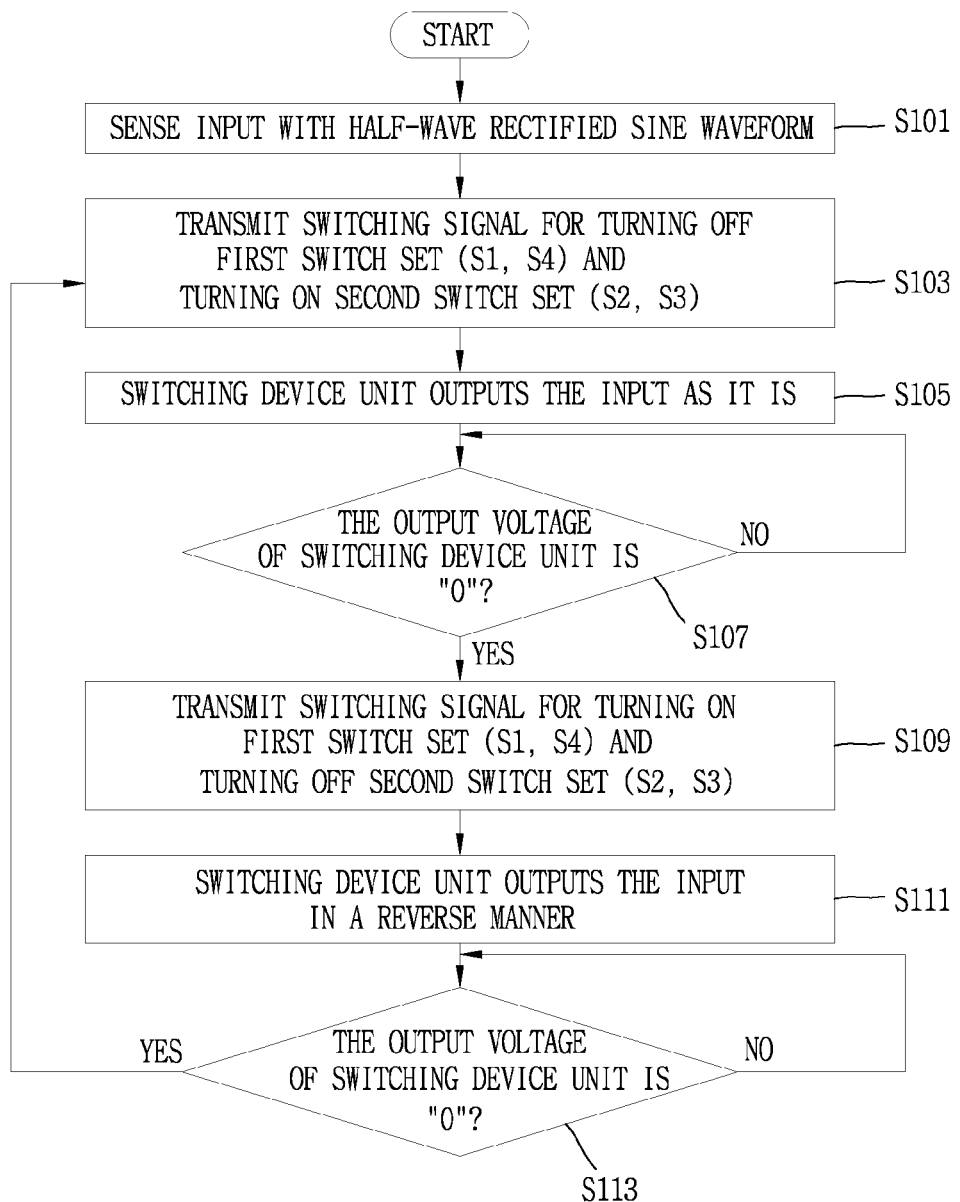
FIG. 4 is a flow chart illustrating the output process of a switching device unit.

FIG. 4 is a flow chart illustrating the output process of a switching device unit.

The output process of the switching device unit 130 will be described with reference to FIG. 4.

The controller 115 senses the output voltage of the output voltage (Vinv1) of the Cuk converter 120 being received at the switching device unit 130. According to an embodiment of the present disclosure, the output voltage (Vinv1) of the Cuk converter 120 has a half-wave rectified sine waveform (S101).

Then, the controller 115 transmits the switching signal to the switches (S1-S4) to turn off the first switch set (S1, S4) and turn on the second switch set (S2, S3) (S103).

When the first switch set (S1, S4) is turned off and the second switch set (S2, S3) is turned on, the switching device unit 130 outputs the input as it is. According to an embodiment of the present disclosure, the switching device unit 130 outputs a half-wave rectified sine waveform as it is (S105). In other words, a positive region of the sine waveform is output.

Then, when the output of the switching device unit 130 reaches zero, the controller 115 transmits the switching signal to the switches (S1-S4) to turn off the second switch set and turn on the first switch set (S109). If the output of the switching device unit does not reach zero, then the controller 115 does not transmit the switching signal. Accordingly, the switching device unit 130 maintains a state of outputting the input as it is (S107).

When the controller 115 transmits the switching signal to the switches (S1-S4) to turn off the second switch set and turn on the first switch set, the switching device unit 130 outputs the input in a reverse manner (S111). In other words, the switching device unit 130 outputs a negative region of the sine wave.

Then, the output of the switching device unit 130 reaches zero again, the controller 115 transmits the switching signal again to the switches (S1-S4) to turn off the first switch set (S1, S4) and turn on the second switch set (S2, S3). Then, the foregoing processes (S103-S113) are repeated again. If the output of the switching device unit 130 does not reach zero, then the controller 115 does not transmit the switching signal. Accordingly, the switching device unit 130 continues to output the reversed input (S113).

According to an embodiment of the present disclosure, through the processes (S101-S113), the switching device unit 130 changes the input of a half-wave rectified sine waveform to a sine waveform for the output.

According to an embodiment of the present disclosure, first, when the controller 115 turns on the second switch set and turns off the first switch set through the switching signal, the switching device unit 130 output a sine waveform for the output. Then, the switching device unit 130 outputs all the positive portion of the sine wave, the controller 115 turns off the second switch set and turn on the first switch set through the switching signal. At this time, the switching device unit 130 outputs the input in a reverse manner. In other words, the switching device unit 130 outputs a negative portion of the sine wave. Furthermore, the process may be repeated to form a sine waveform voltage.

Accordingly, the positive direction of a sine waveform is output when switches S2, S3 within the switching device unit 130 are closed, and switches S1, S4 are open, and the negative direction of a sine waveform is output when switches S1, S4 within the switching device unit 130 are closed and switches S2, S3 are open.

According to an embodiment of the present disclosure, the controller 115 varies the duty of the switch (S5) in time such that a half-wave rectified sine waveform voltage is present at both ends of the diode, and controls the four switches (S1-S4) such that the output end outputs a sine waveform voltage.

Figure 5:
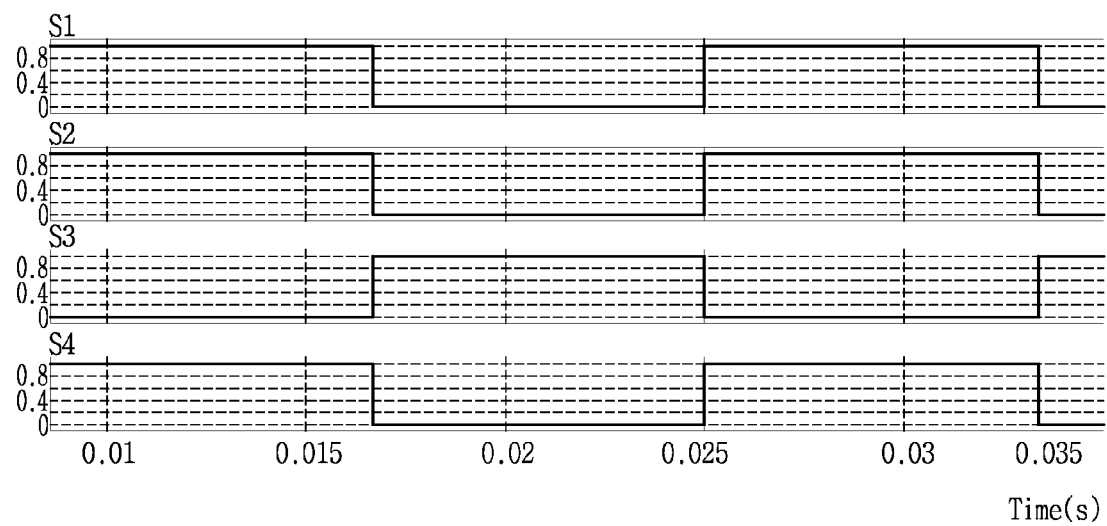
FIG. 5 is a view illustrating the switching duty of switches in a switching device unit according to an embodiment of the present disclosure.

FIG. 5 is a view illustrating the switching duty of switches in a switching device unit according to an embodiment of the present disclosure.

Referring to FIG. 5, it is seen that the switches (S1-S4) in the switching device unit 130 are switched less frequently than the switch (S5) within the Cuk converter 120.

In this manner, contrary to the related art, the switches (S1, S2, S3, S4) within the switching device unit 130 merely performs the role of converting an output with a half-wave rectified sine waveform into a sine waveform, but the switches (S1, S2, S3, S4) within the switching device unit 130 does not involve in PWM control according to high-speed switching, thereby reducing switching loss compared to the related art.

The output unit 140 outputs a value being output from the switching device unit 130.

Owing to such a method, the switches (S1, S2, S3, S4) within the switching device unit 130 merely perform the role of converting an output with a half-wave rectified sine waveform into a sine waveform, but the switches (S1, S2, S3, S4) within the switching device unit 130 does not involve in PWM control according to high-speed switching, thereby reducing switching loss compared to the related art.

The output unit 140 outputs a value (Vout1) being output from the switching device unit 130.

The output unit 140 according to an embodiment of the present disclosure is output between the switch (S1) and switch (S2) and between the switch (S3) and switch (S4) among the switches within the switching device unit 130 as illustrated in FIG. 2.

Figure 6:
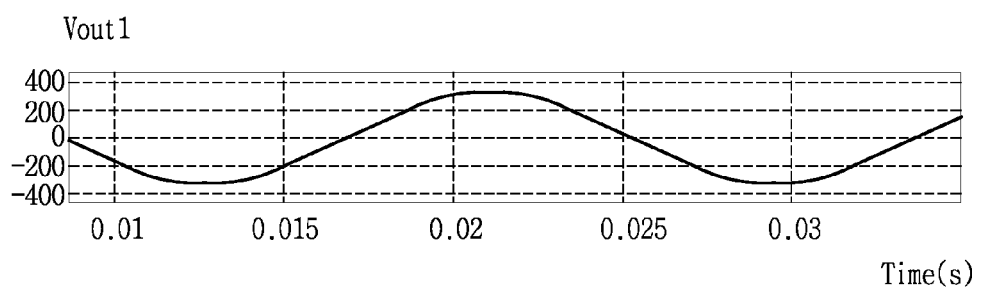
FIG. 6 is a view illustrating the waveform of an output voltage according to an embodiment of the present disclosure.

FIG. 6 is a view illustrating the waveform of an output voltage according to an embodiment of the present disclosure.

As illustrated in FIG. 6, the output voltage (Vout1) according to an embodiment of the present disclosure has a sine waveform. Next, an inverter according to an embodiment of the present disclosure will be described with reference to FIGS. 7 through 11.

Figure 7:
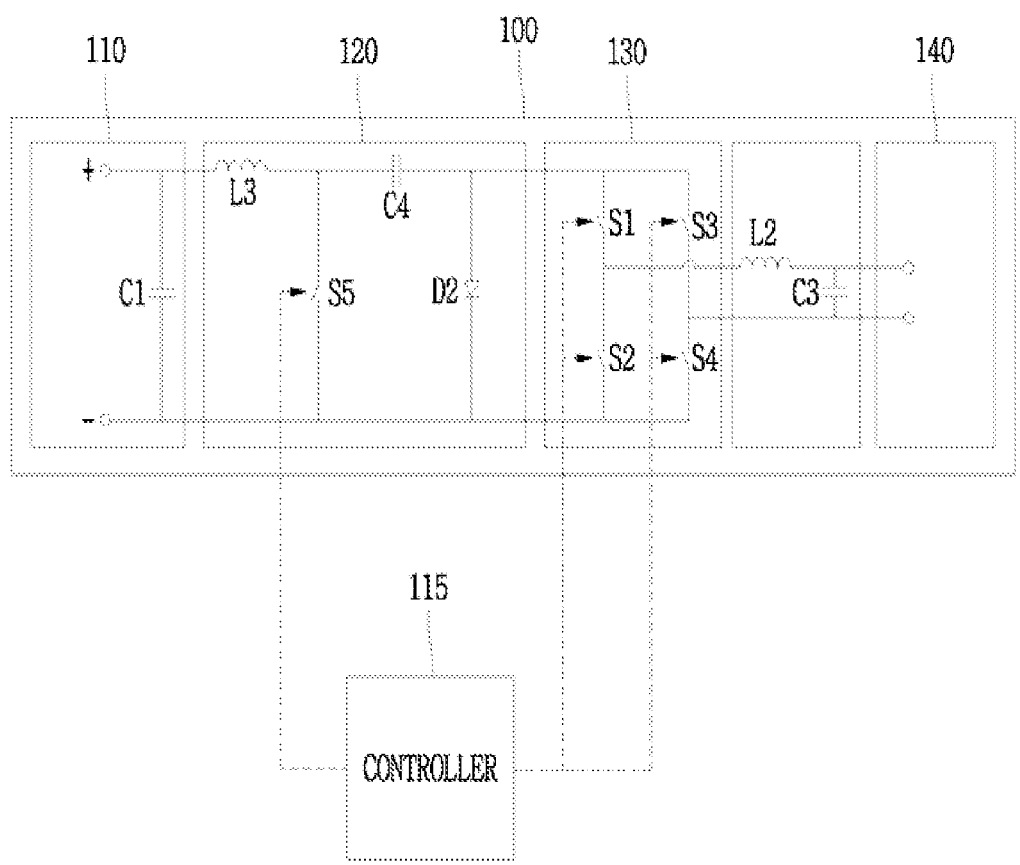
FIG. 7 is view illustrating an inverter according to another embodiment of the present disclosure.

FIG. 7 is view illustrating an inverter according to another embodiment of the present disclosure.

As illustrated in FIG. 7, an inverter 200 according to an embodiment of the present disclosure may include an input unit 110, a controller 115, a Cuk converter from which a filter portion is removed 220, a switching device unit 230, a filter unit 240, and an output unit 250.

The Cuk converter from which a filter portion is removed 220 receives an input voltage (Vi) and outputs an output voltage (Vinv2) to the switching device unit 230.

The Cuk converter from which a filter portion is removed 220 according to an embodiment of the present disclosure may include an inductor (L3), a capacitor (C4), a diode (D2) and a switch (S10) within the converter.

An end of the inductor (L3) is connected to an end of the capacitor (C1), and the other end of the inductor (L3) is connected to an end of the capacitor (C4).

An end of the switch (S10) within the converter is connected to a matching point between the inductor (L1) and the capacitor (C4), and the other end of the switch (S10) within the converter is connected to the minus terminal.

The other end of the capacitor (C4) is connected to an anode of the diode (D2).

A cathode of the diode (D2) is connected to the minus terminal.

A ratio of the output voltage (Vinv2) of the Cuk converter from which a filter portion is removed 220 to the input voltage (Vi) may be defined as Equation 2.

$$Vinv2/Vi = D/(1-D)$$ [Equation 2]

(Vinv2: output voltage of the Cuk converter from which a filter portion is removed 220, Vi: input voltage, D: switching duty of the switch (S10) within the Cuk converter from which a filter portion is removed 220)

According to Equation 2, if the switching duty is changed, then the output voltage (Vinv2) of the Cuk converter from which a filter portion is removed 220 varies in correspondence to this.

According to an embodiment of the present disclosure, in case where a constant DC voltage is applied to the input voltage (Vi), if the controller 115 changes the switching duty (D) of the switch (S10) within the Cuk converter from which a filter portion is removed 220, then the output voltage (Vinv2) of the Cuk converter from which a filter portion is removed 220 varies in correspondence to the value of D. Accordingly, the output voltage (Vinv2) of the Cuk converter from which a filter portion is removed 220 with a users desired form may be obtained by adjusting the value of D. According to an embodiment of the present disclosure, when the controller 115 adjusts the switching duty (D) of S10, the Cuk converter from which a filter portion is removed 220 according to an embodiment of the present disclosure changes the input voltage (Vi) to a half-wave rectified sine waveform PWM control voltage for the output.

Figure 8:
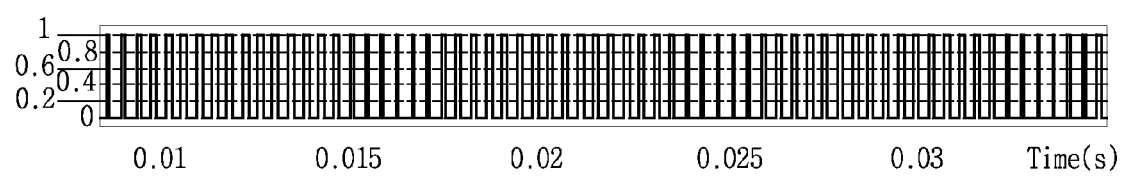
FIG. 8 is a view illustrating the switching duty of a switch within a Cuk converter from which a filter portion is removed according to an embodiment of the present disclosure.
Figure 9:
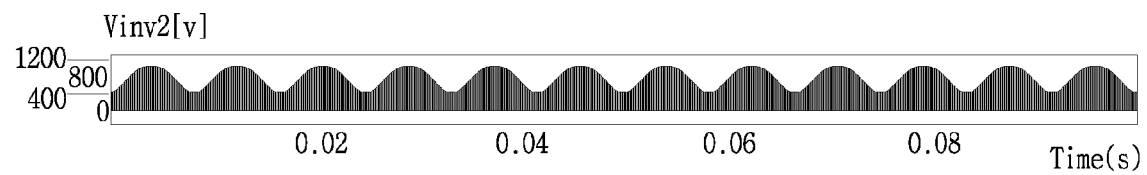
FIG. 9 is a view illustrating the output voltage wave form diagram of a Cuk converter from which a filter portion is removed according to an embodiment of the present disclosure.

FIG. 8 is a view illustrating the switching duty of a switch within a Cuk converter from which a filter portion is removed according to an embodiment of the present disclosure, and FIG. 9 is a view illustrating the output voltage wave form diagram of a Cuk converter from which a filter portion is removed according to an embodiment of the present disclosure.

According to an embodiment of the present disclosure, when the controller 115 adjusts the switching duty of the switch (S10) within the Cuk converter from which a filter portion is removed 220 in an arbitrary manner as illustrated in FIG. 8, the Cuk converter from which a filter portion is removed 220 may output the output (Vinv2) as a half-wave rectified sine waveform voltage as illustrated in FIG. 9.

The switching device unit 230 receives the output voltage (Vinv2) of the Cuk converter 220 as an input and outputs the output voltage (Vout2).

The switching device unit 230 according to an embodiment of the present disclosure may include four switches (S6, S7, S8, S9).

For the switches according to an embodiment of the present disclosure, the first and the second switch (S6, S7) and the third and the fourth switch (S8, S9) connected in series to each other are connected in parallel to the diode (D2), respectively.

The switches (S6-S9) according to an embodiment of the present disclosure operate by receiving a switching signal of the controller 115. According to an embodiment of the present disclosure, the controller 115 may adjust the switching signal, thereby allowing a set of the sixth and the ninth switch (first switch set) and another set of the seventh and the eighth switch (second switch set) to be alternately switched for each set.

The alternate timing of the switch is a time point at which the output voltage of the switching device unit 130 becomes zero.

The output process of the switching device unit follows the foregoing processes (S103-S113). However, the switches S1-S4 correspond to the switches S6-S9, respectively. Furthermore, the input voltage of the switching device unit is a half-wave rectified sine waveform PWM control voltage other than a half-wave rectified sine waveform voltage.

According to an embodiment of the present disclosure, the controller 115 varies the duty of the switch (S10) in time such that a half-wave rectified sine waveform voltage is present at both ends of the diode, and controls the four switches (S6-S9) such that the output end outputs a sine waveform voltage.

Figure 10:
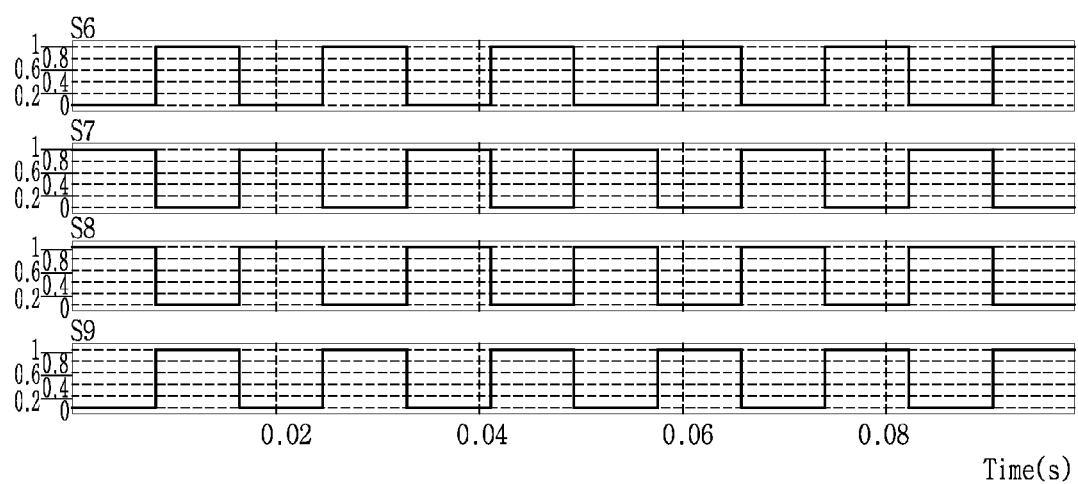
FIG. 10 is a view illustrating the switching duty of switches in a switching device unit according to an embodiment of the present disclosure.

FIG. 10 is a view illustrating the switching duty of switches in a switching device unit according to an embodiment of the present disclosure.

Referring to FIG. 10, it is seen that the switches (S6-S9) in the switching device unit 230 are switched less frequently than the switch (S10) within the Cuk converter from which a filter portion is removed 220.

In this manner, contrary to the related art, the switches (S6, S7, S8, S9) within the switching device unit 230 merely performs the role of converting a half-wave rectified sine waveform PWM control voltage into a sine waveform PWM control voltage, but the switches (S6, S7, S8, S9) within the switching device unit 230 does not involve in PWM control according to high-speed switching, thereby reducing switching loss compared to the related art.

The filter unit 240 filters the output of the display unit 230.

The filter unit 240 may include the inductor (L4) and the capacitor (C5).

An end of the inductor (L4) is connected to a matching point between the switch (S6) and the switch (S7), and the other end of the inductor (L4) is connected to an end of the capacitor (C5).

The other end of the capacitor (C5) is connected to a matching point between the switch (S8) and the switch (S9).

The output unit 250 outputs a filtered value from the filter unit 240.

The output unit 250 according to an embodiment of the present disclosure outputs a voltage (Vout2) at both ends of the capacitor (C5) as illustrated in FIG. 7.

Figure 11:
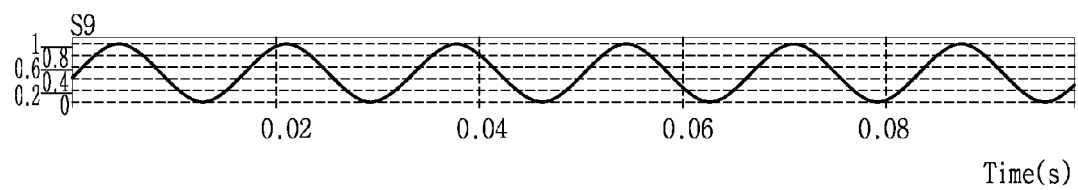
FIG. 11 is a view illustrating the waveform of an output voltage according to an embodiment of the present disclosure.

FIG. 11 is a view illustrating the waveform of an output voltage according to an embodiment of the present disclosure.

As illustrated in FIG. 11, the output voltage (Vout2) according to an embodiment of the present disclosure has a sine waveform.

According to an embodiment of the present disclosure, the switching loss of the inverter may be reduced, thereby increasing the efficiency of the inverter.

The foregoing embodiment according to the present disclosure may not be implemented only through an apparatus and a method using the same, and also implemented through a program for executing a function corresponding to the configuration of the embodiment according to the present disclosure or through a recording medium written with the program, and the implementation may be easily carried out by those skilled in the art to which the invention pertains from the foregoing description of the embodiment.

Although the embodiment of the present disclosure has been described in detail, the rights scope of the present invention is not limited to the embodiments and various modifications and improvements thereto made by those skilled in the art using the basic concept of the present invention as defined in the accompanying claims will fall in the rights scope of the invention.

What is claimed is:

1. An inverter, comprising:
   a converter having a converter switch and configured to convert a DC voltage into a full wave rectified sine waveform voltage;
   a switching device unit having a plurality of switches and configured to convert the full wave rectified sine waveform voltage into a sine waveform voltage; and
   a controller configured to control the converter switch and the plurality of switches to turn off and on,
   wherein the controller converts the DC voltage into the full-wave rectified sine waveform voltage by changing duty cycles of the converter switch at a preset rate and converts the full-wave rectified sine waveform voltage into the sine waveform voltage by changing duty cycles of the plurality of switches.

2. The inverter of claim 1, wherein the converter is a Cuk converter.

3. The inverter of claim 2, wherein the controller is further configured to:
   vary a switching duty cycle of a switch within the Cuk converter such that a half-wave rectified sine waveform voltage is output from the Cuk converter; and
   control the plurality of switches such that a sine waveform voltage is output from the inverter.

4. The inverter of claim 1, further comprising a filter located at an output of the switching device unit.

5. The inverter of claim 4, wherein the controller is further configured to:
   vary a switching duty cycle of a switch within the Cuk converter such that a half-wave rectified sine waveform voltage is output from the Cuk converter; and
   control the plurality of switches such that a sine waveform voltage is output from the inverter.

6. The inverter of claim 1, wherein the converter comprises a filter.

7. The inverter of claim 6, wherein the controller is further configured to:
   vary a switching duty cycle of a switch within the Cuk converter such that a half-wave rectified sine waveform voltage is output from the Cuk converter; and control the plurality of switches such that a sine waveform voltage is output from the inverter.

8. An inverter, comprising:
a first inductor;
a first switch connected to the first inductor;
a first capacitor having a first end connected to a first end of the first switch;
a diode having an anode connected to a second end of the first capacitor and a cathode connected to a second end of the first switch;
four second switches connected in a bridge form, each of the four second switches having two inputs and two outputs, one of the two inputs connected to a first end of the diode and the other of the two inputs connected to a second end of the diode; and
a controller connected to the first switch and to each of the four second switches,
wherein the controller varies a duty cycle of the first switch such that a half-wave rectified sine waveform voltage is output from the first and second ends of the diode and controls the four second switches such that the two outputs of each of the four second switches output sine waveform voltages.

9. The inverter of claim 8, further comprising:
a second inductor a first end of which is connected to a first of the two outputs of each of the four second switches; and
a second capacitor a first end of which is connected to a second of the two outputs of each of the four second switches,
wherein a second end of the second inductor and a second end of the second capacitor are connected to each other.

10. The inverter of claim 8, further comprising:
a second inductor connected to the anode of the diode; and
a second capacitor connected to the inverter and the cathode of the diode.

* * * * *